UNITED STATES PATENT OFFICE.

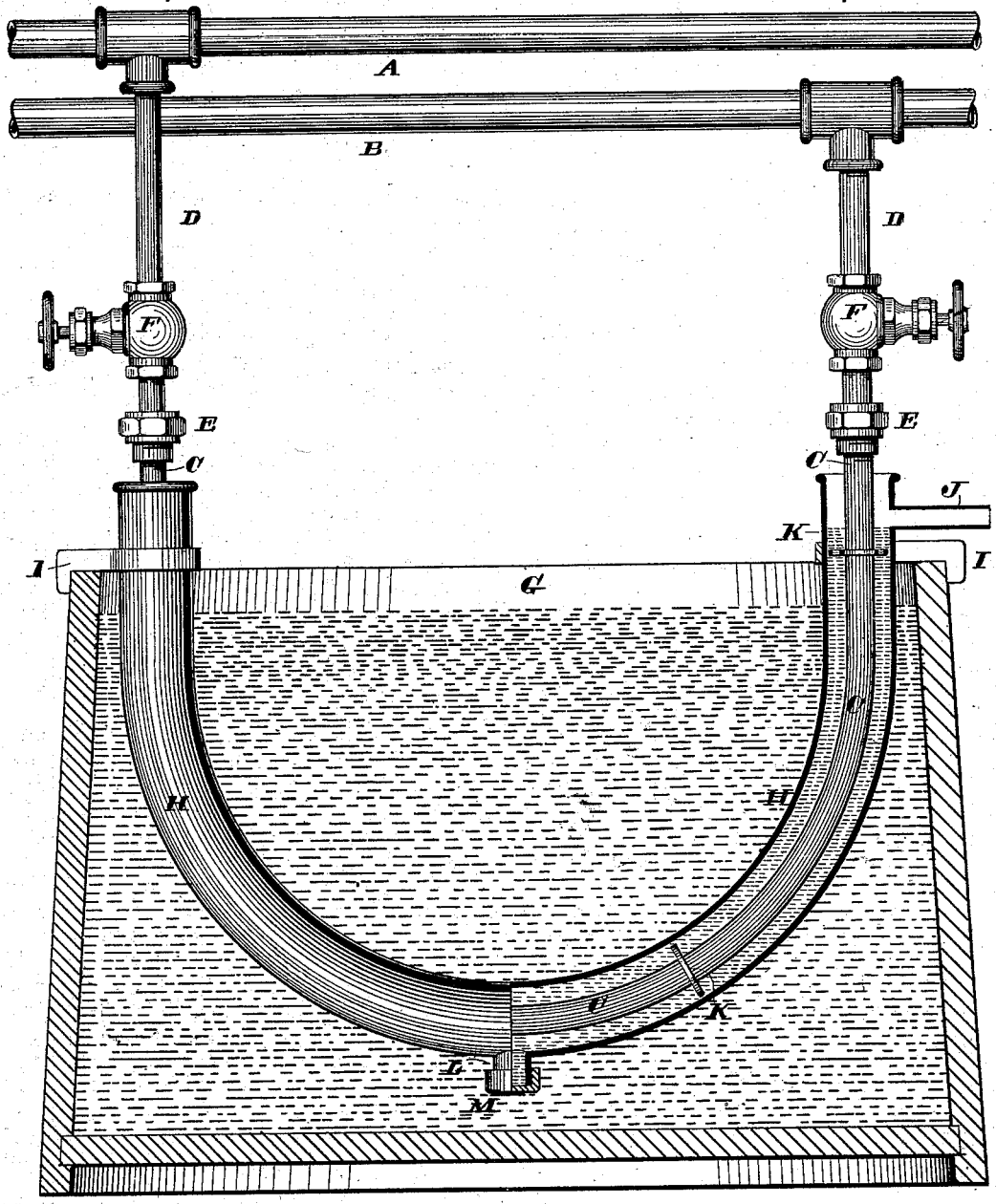

JOHN W. SCHORR, OF ST. LOUIS, MISSOURI.

APPARATUS FOR COOLING BEER, &c.

SPECIFICATION forming part of Letters Patent No. 274,830, dated March 27, 1883.

Application filed October 5, 1882. (No model.)

*To all whom it may concern:*

Be it known that I, JOHN W. SCHORR, of the city of St. Louis, in the State of Missouri, have invented a certain new and useful Improvement in Apparatuses for Cooling Beer, &c., of which the following is a full, clear, and exact description, reference being had to the accompanying drawing, forming part of this specification, and which is a side elevation, part in section.

My invention relates to a device for cooling beer while undergoing fermentation; and my invention consists in circulating a cooling substance—as cold brine or ammonia—through the beer by means of a pipe connected with the feed and return pipes of a refrigerating system, the part of this circulating-pipe within the beer-vat being inclosed by means of an outer pipe, which increases the cooling-surface of the device and receives any leakage from the inner pipe, avoiding all danger of the beer thus being destroyed or injured.

Referring to the drawing, A represents the feed and B the return pipe of a refrigerating system, and C a U or other shaped pipe, whose opposite ends connect, respectively, with the pipes A and B. Suitable connecting lengths, D, and couplings E are employed to make the connection.

F are valves or cocks in the lengths D for regulating or closing communication between the pipes.

The pipe C extends down into a beer vat or tub, G, placed beneath it, and the cold brine or ammonia circulated through it keeps the beer at the proper temperature while passing through the process. The pipe C within the vat is inclosed by an outer pipe, H, the function of which is to increase the cooling-surface, and, further, to avoid all danger of the contents of the pipe C leaking into and destroying the beer. The pipe H is supported by means of hooks I, secured thereto and engaging over the upper edge of the vat, as shown. In addition, or in lieu of these hooks, it may have suitable legs placed beneath it, resting on the bottom of the vat.

To indicate at once any leak of the pipe C, I fill this outer pipe with water and provide it with an overflow-spout, J. As the pipe is kept full of water up to the spout, the slightest leakage will start the overflow, when the cocks F would be closed, and the pipe C disconnected by means of the couplings D and removed for repairs.

The pipe H is held concentric with that C by means of disks K, secured to the latter. The pipe H is preferably provided with an outlet, L, at bottom, closed by a cap, M, by the opening of which the water can be drained from the pipe.

I do not confine myself to the shape or form of the pipes, nor to the manner of supporting the outer pipe, nor to the manner shown for connecting the pipe C to the main pipes; but What I desire to secure by Letters Patent is—

1. The combination, with a vat for containing beer, and a cooling-pipe passing through said vat, of the outer inclosing pipe or jacket, open at each end, said inclosing-pipe adapted to catch leakage from and increase the cooling-surface of the inner pipe, as set forth.

2. In a beer-cooling apparatus, the combination of a suitable vat for containing beer, a pipe for conducting the cooling-liquid from the main pipes of the system, and an outer pipe inclosing the conducting-pipe, adapted to catch the leakage from and increase the cooling-surface of the conducting-pipe, as set forth.

3. In a beer-cooling apparatus, the combination, with the pipe connected to the main pipes of the system, of the outer inclosing-pipe provided with a spout for the overflow of the water in the inclosing-pipe, as and for the purpose set forth.

4. In a beer-cooling apparatus, the combination of suitable vat, main pipes A B, connecting lengths D, valves F, couplings E, circulating-pipe C, and outer inclosing-pipe, H, having overflow-pipe J, and hooks I, supporting said inclosing-pipe, substantially as shown and described.

JOHN W. SCHORR.

Witnesses:
 GEO. H. KNIGHT,
 AUG. WEBER.